United States Patent
Lin et al.

(10) Patent No.: US 11,741,555 B2
(45) Date of Patent: Aug. 29, 2023

(54) CROP YIELD ESTIMATION METHOD BASED ON DEEP TEMPORAL AND SPATIAL FEATURE COMBINED LEARNING

(71) Applicant: ZHEJIANG UNIVERSITY, Zhejiang (CN)

(72) Inventors: Tao Lin, Zhejiang (CN); Renhai Zhong, Zhejiang (CN); Jinfan Xu, Zhejiang (CN); Hao Jiang, Zhejiang (CN); Yibin Ying, Zhejiang (CN); Kuan-Chong Ting, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 17/777,053

(22) PCT Filed: Oct. 29, 2020

(86) PCT No.: PCT/CN2020/124870
§ 371 (c)(1),
(2) Date: May 16, 2022

(87) PCT Pub. No.: WO2021/098472
PCT Pub. Date: May 27, 2021

(65) Prior Publication Data
US 2022/0405864 A1 Dec. 22, 2022

(30) Foreign Application Priority Data
Nov. 19, 2019 (CN) .......................... 201911134971.4

(51) Int. Cl.
*G06Q 50/02* (2012.01)
*G01W 1/02* (2006.01)
(Continued)

(52) U.S. Cl.
CPC .............. *G06Q 50/02* (2013.01); *G01W 1/02* (2013.01); *G06N 3/045* (2023.01); *G06N 3/049* (2013.01); *G06N 3/084* (2013.01); *G06Q 10/04* (2013.01)

(58) Field of Classification Search
CPC ......... G06Q 50/02; G06Q 10/04; G01W 1/02; G06N 3/045; G06N 3/049; G06N 3/084; G06F 16/2474; G06F 16/29
See application file for complete search history.

(56) References Cited

U.S. PATENT DOCUMENTS

| | | | | |
|---|---|---|---|---|
| 10,733,876 B2 * | 8/2020 | Moura | ...................... | G06N 3/08 |
| 11,048,248 B2 * | 6/2021 | Cella | ...................... | H04B 17/23 |

(Continued)

FOREIGN PATENT DOCUMENTS

| | | |
|---|---|---|
| CN | 109886496 | 6/2019 |
| CN | 110443420 | 11/2019 |
| CN | 111027752 | 4/2020 |

OTHER PUBLICATIONS

Xu et al. (Spatio-temporal prediction of crop disease severity for agricultural emergency management based on recurrent neural networks, 2018) (Year: 2018).*

(Continued)

*Primary Examiner* — Mohammad K Islam
(74) *Attorney, Agent, or Firm* — JCIPRNET

(57) ABSTRACT

A crop yield estimation method based on spatio-temporal deep learning including: obtaining regional historical crop yield data and meteorological data, preprocessing the meteorological data and the yield data to respectively obtain meteorological parameters and a detrended yield as input and output of the crop yield spatio-temporal deep learning model; constructing the spatio-temporal deep learning model for crop yield estimation, and optimizing hyperparameters; and building a training set by taking the meteorological parameters as an input and the detrended yield as output to train the model and obtain parameters of the model; for the crop yield to be estimated, feeding meteorological parameters into the trained model, and obtaining the crop yield estimation result. The model combined temporal and spatial learning to achieve better crop yield estimation accuracy and stability at large spatial scales.

6 Claims, 3 Drawing Sheets

(51) Int. Cl.
    *G06N 3/049*     (2023.01)
    *G06N 3/084*     (2023.01)
    *G06Q 10/04*     (2023.01)
    *G06N 3/045*     (2023.01)

(56) References Cited

U.S. PATENT DOCUMENTS

| | | | | |
|---|---|---|---|---|
| 11,126,173 | B2 * | 9/2021 | Cella | G05B 23/0286 |
| 11,199,835 | B2 * | 12/2021 | Cella | G05B 23/0229 |
| 11,199,837 | B2 * | 12/2021 | Cella | G05B 19/4185 |
| 11,592,594 | B2 * | 2/2023 | Prindle | G01V 99/005 |
| 11,625,627 | B2 * | 4/2023 | Kumar | G06N 20/00 |
| | | | | 702/3 |

OTHER PUBLICATIONS

Adeyemi et al. (Dynamic Neural Network Modelling of Soil Moisture Content for Predictive Irrigation Scheduling, 2018) (Year: 2018).*

Tao Lin et al., "DeepCropNet: a deep spatial-temporal learning framework for county-level corn yield estimation", Environmental Research Letters, Feb. 2020, pp. 1-13.

Hao Jiang, "A deep learning approach to conflating heterogeneous geospatial data for corn yield estimation: A case study of the US Corn Belt at the county level", Global Change Biology, Oct. 2019, pp. 1-13.

"International Search Report (Form PCT/ISA/210) of PCT/CN2020/124870," dated Jan. 27, 2021, with English translation thereof, pp. 1-4.

* cited by examiner

CROP YIELD ESTIMATION METHOD BASED ON DEEP TEMPORAL AND SPATIAL FEATURE COMBINED LEARNING

CROSS-REFERENCE TO RELATED APPLICATION

This application is a 371 of international application of PCT application serial no. PCT/CN2020/124870, filed on Oct. 29, 2020, which claims the priority benefit of China application no. 201911134971.4, filed on Nov. 19, 2019. The entirety of each of the above mentioned patent applications is hereby incorporated by reference herein and made a part of this specification.

FIELD OF THE DISCLOSURE

The disclosure relates to the field of agricultural meteorology, in particular to a crop yield estimation method based on deep temporal and spatial feature combined learning.

DESCRIPTION OF RELATED ART

Constructing a crop yield estimation model is an important research method to quantitatively evaluate the crop growth in response to changes in meteorological resources. The impact of meteorological resources on crops has dynamic changes and cumulative effects in time sequence, and understanding these time sequence features helps to optimize policies for crop yield. The spatial distribution of meteorological resources has spatial heterogeneity, which leads to spatial distribution differences of crop growth and yield distribution, and affects the stability of the model. How to construct a deep learning model which can perform spatio-temporal deep learning related to crop growth and meteorology is the current technical difficulty and a key breakthrough.

Current crop yield estimation models mainly adopt three approaches: (1) process mechanism models driven by physiological processes; (2) statistical regression models; (3) data-driven machine learning models. The process mechanism model is difficult to be applied in a large spatial scale due to its over-parameterization and data requirements. There is difficulty for the statistical regression model to deal with the nonlinear relationship and collinearity in the data. As for current machine learning method, it is performed simply by extracting data feature through a machine learning model to carry out yield estimation. Not only that there is a lack of crop yield estimation method using machine learning, but also there is no method that can perform accurate estimation by using spatio-temporal deep learning.

SUMMARY OF THE DISCLOSURE

In order to solve the deficiencies in the conventional technology, the present disclosure provides a crop yield estimation method based on spatio-temporal deep learning.

The present disclosure adopts the following technical solutions, and the specific steps are as follows:

Step 1): Historical crop yield data and meteorological data of a region are obtained and preprocessed, and the meteorological data is preprocessed to obtain meteorological parameters. The yield data is preprocessed to obtain a detrended yield. The meteorological parameters and the detrended yield are respectively taken as input and output data of a subsequent crop yield spatio-temporal deep learning model.

Step 2): A crop yield spatio-temporal deep learning model is constructed, and hyperparameters of the model are optimized.

Step 3): A training set sample is formed by taking the meteorological parameters obtained in step 1) as an input and the detrended yield obtained in step 1) as an output so as to train the crop yield spatio-temporal deep learning model, thereby obtaining parameters of the model by using Adam optimization method combined with backpropagation method training. After multiple rounds of training, the optimal parameters are obtained, and then the trained model is obtained.

Step 4): The meteorological parameters of a crop yield to be estimated are input into the trained model, and an estimation result is output, thereby obtaining a crop yield estimation result. In the specific implementation, the crop yield estimation result is further compared with the detrended yield to process and obtain the estimation effect of the model on the unknown sample.

In the step 1), data preprocessing includes: a yield-year univariate linear regression equation is constructed according to historical crop yield data, and detrending is performed to the crop yield data, the residual error obtained by fitting the yield-year univariate linear regression equation is taken as the detrended yield and output by the model as a true value. The meteorological parameters from planting to maturity of crop in time sequence is extracted from the historical meteorological data to be subjected to normalization and taken as the input of model.

In the specific implementation, according to historical meteorological data, the meteorological parameters at various moments in the corn growing period can be calculated and normalized as the input for the model at various moments, and time sequence iterative processing can be performed during model training.

The historical meteorological data specifically includes daily highest temperature, daily lowest temperature and daily average temperature within a fixed time period and daily precipitation within a fixed time period.

In the step 2), as shown in FIG. 2, the crop yield spatio-temporal deep learning model is mainly composed of an input layer, a long short-term memory neural network layer, an attention neural network layer and a multi-task output layer connected in sequence.

In the input layer, the meteorological parameter time sequence during the crop growth period is input, and the min-max normalization is performed to transform the range of each meteorological parameter into [0,1].

The long short-term memory neural network layer is composed of long short-term memory neural units. The meteorological parameter $x_t$ at various moments is input into the corresponding long short-term memory group composed of three consecutively connected long short-term memory neural units. Moreover, the first long short-term memory neural unit in the long short-term memory group corresponding to the meteorological parameters $x_t$ at all moments are transmitted and connected in sequence along the time (the time corresponding to the long short-term memory neural units), and share the parameters of the neural network. The second long short-term memory neural unit in the long short-term memory group corresponding to the meteorological parameters $x_t$ at all moments are transmitted and connected in sequence along the time, and share the parameters of the neural network. The third long short-term memory neural unit in the long short-term memory group corresponding to the meteorological parameters $x_t$ at all moments are transmitted and connected in sequence along the time, and share the parameters of the neural network. Finally, the meteorological parameters $x_t$ at various moments are processed by the long short-term memory group to output their respective hidden layer features $h_t$.

The attention neural network layer adopts a fully connected neural network layer, inputs the hidden feature $h_t$ extracted by the long short-term memory neural network layer at various moments t, outputs the attention value $\alpha_t$ at various moments, and then adjusts the hidden feature $h_t$ of the entire time sequence according to the attention value $\alpha_t$, and performs processing according to the following formula to obtain the attention-weighted hidden feature $\alpha_t h_t$. The attention-weighted hidden features of all time sequences are merged into a feature vector H.

$$\alpha_t = \text{softmax}(W_A * h_t + b_A)$$

$$H = \alpha_1 h_1 + \alpha_2 h_2 + \ldots + \alpha_t h_t$$

In the formula, $W_A$ and $b_A$ respectively represent the learnable weight matrix and bias vector of the attention neural network layer, and softmax( ) is the activation function, which maps the range of values to the (0,1) interval.

The multi-task output layer constructs a region-specific output layer according to spatial differences, and outputs the crop yield y in the corresponding region r, and the processing is expressed as follows.

$$y = W_r * H + b_r$$

In the formula, r represents the index of the corresponding region, and $w_r$ and $b_r$ respectively represent the learnable weight matrix and bias vector of the multi-task output layer corresponding to the region r, respectively.

The long short-term memory neural network layer is used to process time sequence data and extract time features.

The attention neural network layer is used to quantify the importance of various time sequences and assign weights to temporal features.

A multi-task output layer is configured for learning spatially specific features and outputting estimated crop yield values. The multi-task output layer is divided into different tasks according to the region, and a geographical region-specific fully connected output layer is constructed without activation function.

In the step 2), the model hyperparameter optimization includes the number of layers of long short-term memory neural network layers, the number of layers of attention neural network layers, the number of layers of multi-task output layers and the number of tasks, the hidden feature dimension of various layers and the learning rate of model training. After cross-validation, the optimal model hyperparameters are selected.

In the specific implementation, the number of layers of the long short-term memory neural network is 3, and the hidden feature dimension is 32. The structure of the attention neural network layer is a fully connected neural network layer, and the activation function is softmax( ). The multi-task output layer is divided into different tasks according to the research region, and a region-specific fully connected output layer is constructed without activation function.

In the step 3), the training set data is input into the model, and the weight of the model is obtained by training using the Adam method combined with the back-propagation algorithm, specifically to obtain the parameters of $W_A$, $b_A$, $W_r$, $b_r$, until the loss function value of training set converges to the lowest value.

In the step 4), the crop yield of the crop sample is estimated through the output of the model, for example, the yield per unit area of corn, wheat, and rice.

In the step 4), the time sequence of meteorological parameters of various regions can be input, and the crop yield of various regions can be estimated through the output of the model.

Based on the deep learning method, the disclosure learns temporal features and spatial features from historical meteorological data and crop yield data, thereby improving the crop yield estimation accuracy under large spatial scales. Time sequence feature in data is extracted through a long short-term memory neural network embedded with an attention mechanism. Then, the multi-task learning method is used to construct a region-specific output layer to learn the spatial-specific features of various regions, and output the estimated crop yield.

The advantageous effects of the present disclosure are:

Based on the long short-term memory neural network, the attention mechanism and the multi-task learning method, the disclosure constructs a deep learning model framework that simultaneously learns the time-sequence features and the space-specific features in the crop growth process, and realizes the temporal and the spatial feature combined learning, which improves the accuracy and stability of the model for crop yield estimation. The embedded attention mechanism can visualize the processing performed to the temporal features by the model, which helps to determine key growth periods to assist in decision-making. The disclosure extracts the region-specific spatial features of various regions through a multi-task learning method, and in the case where there are large spatial differences in the research regions, the crop yield estimation accuracy of the disclosure is higher and the stability is improved.

To sum up, the present disclosure combines temporal feature learning and spatial feature learning to realize crop yield estimation. In research regions with large spatial differences and complexities, the crop yield estimation accuracy of the present disclosure is higher and the stability is improved.

DESCRIPTION OF EMBODIMENTS

To facilitate better understanding of the present disclosure, the present disclosure will be described in further detail below with reference to the embodiments, but the scope of claims in the present disclosure is not limited to the scope described in the embodiments. The following examples are run on Python software. The present disclosure will be further described below with reference to the accompanying drawings and embodiments.

This embodiment is applied to quantitative estimation of county-level corn yield. The selected research region is the Corn Belt region in the U.S., which includes county-level data for 11 states: Minnesota (MN), Wisconsin (WI), Michigan (MI), Nebraska (NE), Iowa (IA), Illinois (IL), Indiana (IN), Ohio (OH), Kansas (KS), Missouri (MO) and Kentucky (KY). The data used are county-level corn yield and meteorological data from 1981 to 2016, all from public datasets. The meteorological indicators selected in this embodiment include: Growing Degree Days (GDD), Killing Degree Days (KDD) and the PRCP (accumulated precipitation). The corn yield and meteorological indicators of a county in each year are taken as a sample, and there are a total of 34,403 samples. Classified by years, the samples from 1981-2014 are used as a training set, with a total of 32,778 samples; the samples from 2015-2016 are used as the test set, with a total of 1,625 samples. In all samples, the minimum detrended yield is −7.63 tons/ha, the maximum detrended yield is 4.13 tons/ha, the mean detrended yield is −0.01 tons/ha, and the standard deviation is 1.32 tons/ha.

Figure 1:
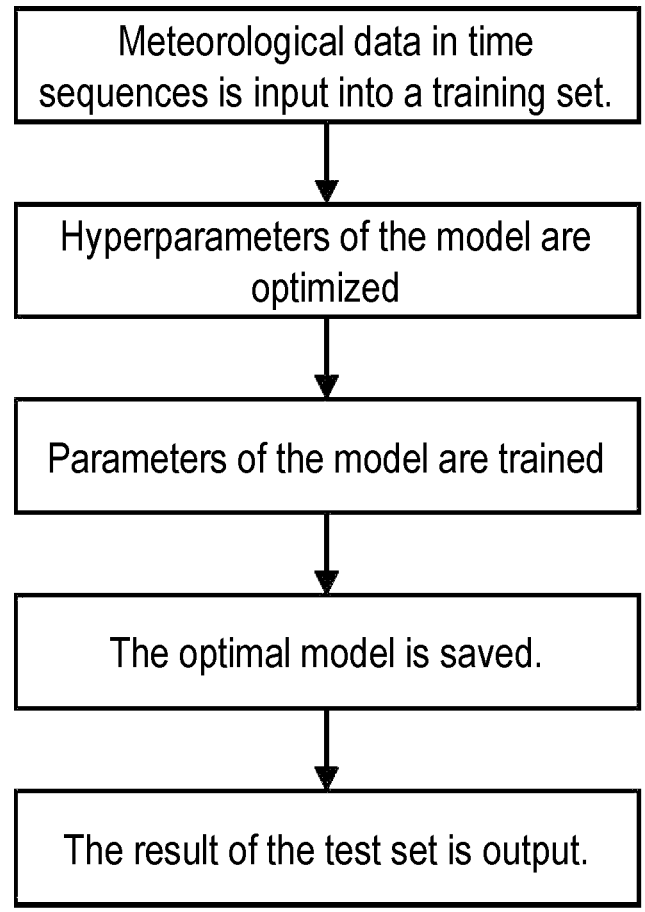
FIG. 1 is a flowchart for modeling according to a method of the present disclosure.

As described in the steps shown in FIG. 1, the process of embodiment is as follows:

1) The training set data is into the model.

Figure 2:
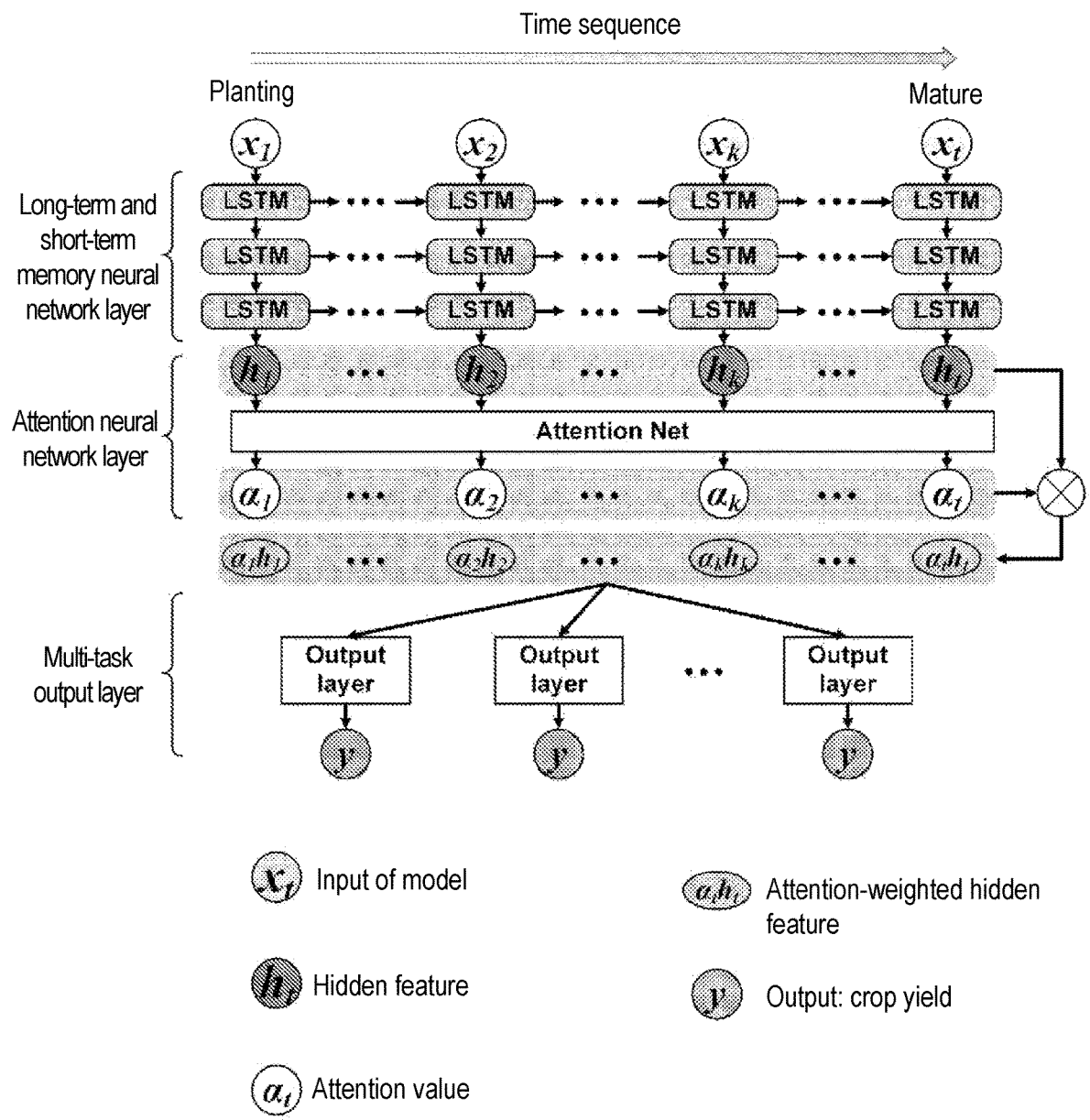
FIG. 2 is a schematic diagram of a model structure according to a method of the present disclosure.

2) The hyperparameters of the model are optimized. The structure of the model is shown in FIG. 2, which includes: a three-layer long short-term memory neural network layer, an attention neural network layer and a multi-task output layer. The time sequence of the model is 20 weeks from sowing to maturity of maize. The hidden feature dimension of the three-layer long short-term memory neural network is set to 32. The structure of the attention neural network layer is a single-layer fully connected neural network, which takes the hidden features extracted by the long short-term memory neural network in various time sequences as input, and outputs the attention value of various time sequences. The output attention value is used to quantify the degree of attention of the representation model to various time sequences. The output layers are three region-specific output layers that output the estimated crop yield values of samples in their respective regions. The optimized hyperparameters contained therein include: the number of layers of the long short-term memory network (3 layers) and the hidden feature dimension (32), the number of layers of the attention neural network (1 layer), and the number of layers of the multi-task output layer (1) and the number of tasks (3), and the learning rate is set to 0.00001.

3) After the hyperparameters of the model are optimized, all the training set data are used again to train the parameters of the model. The parameters of the model are trained on the training set through the back-propagation algorithm, and the model training iterates until the loss function of the training set converges. There are a total of 15830 epochs of training from initialization to completion of training.

4) After the model is trained, the training is terminated, the optimal model is saved, and the effect of the model is tested on the test set. The model accuracy is evaluated based on the RMSE of the predicted and true values of each sample in the test set.

5) The conventional LASSO model and the Random Forest model are trained through the training set data, and tested on the test set. The result is that the RMSE of the LASSO model is 1.16 tons/ha, the RMSE of the Random Forest model is 1.07 tons/ha, and the RMSE from the method provided by the present disclosure is 0.87 tons/ha. It can be seen from the comparison that the accuracy of this method is higher than that of the conventional method in crop yield estimation.

Figure 3:
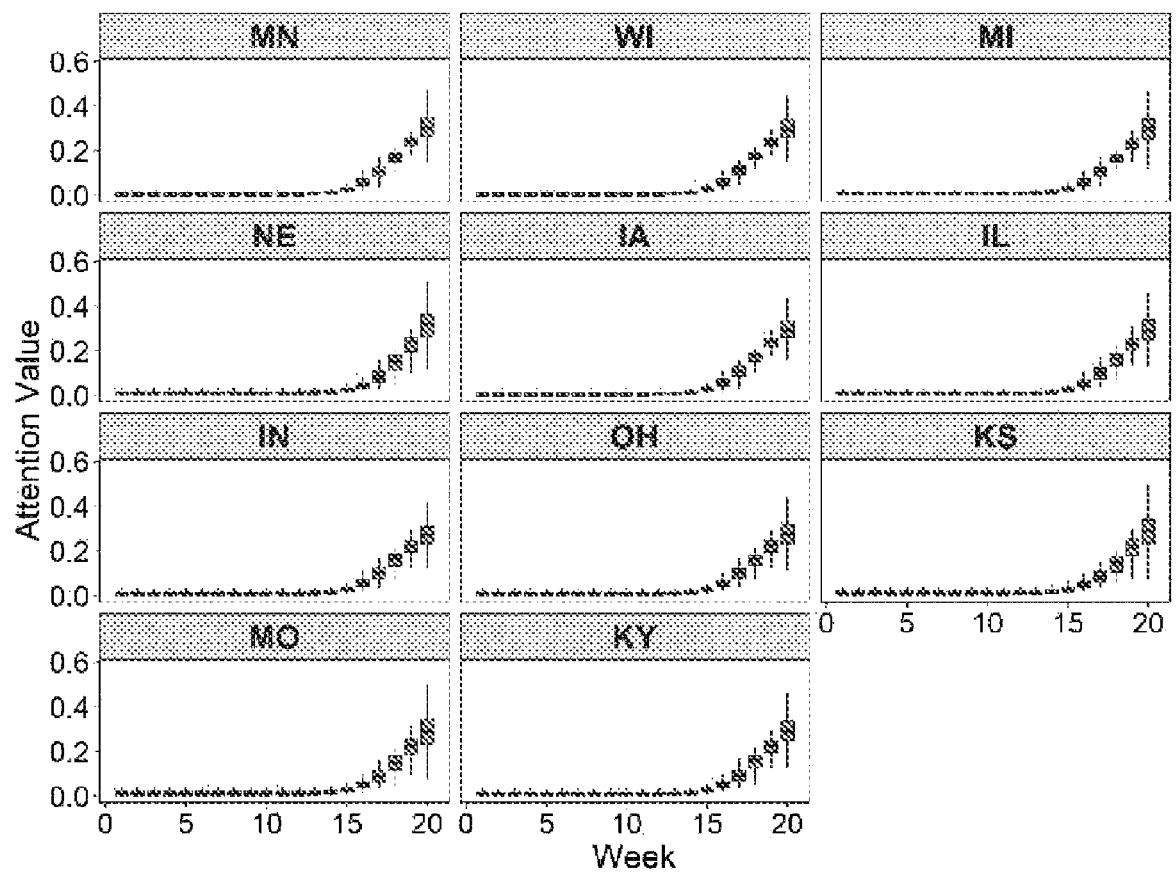
FIG. 3 is a box diagram visually plotting the attention value of the embodiment.

6) Moreover, by visualizing the attention value $\alpha_t$ calculated by the attention network, a box diagram of the attention value of each state at various moments is illustrated as shown in FIG. 3. It can be learned that the model extracts a feature in the time dimension, and this feature is consistent across states. From the first week to the 20th week, the attention value continues to increase, which means that the model pays more attention to the subsequent moments. This result shows that the embedded attention mechanism can visualize the processing performed on the temporal features by the model and improve the interpretability of the model.

What is claimed is:

1. A crop yield estimation method based on spatio-temporal deep learning, comprising the following steps:

step 1): obtaining and preprocessing a historical crop yield data and a historical meteorological data of a region, preprocessing the historical meteorological data to obtain meteorological parameters, preprocessing the historical crop yield data to obtain a detrended yield, and taking respectively the meteorological parameters and the detrended yield as input data and output data of a crop yield spatio-temporal deep learning model;

step 2): constructing the crop yield spatio-temporal deep learning model, and optimizing hyperparameters of the crop yield spatio-temporal deep learning model;

step 3): forming a training set sample by taking the meteorological parameters obtained in step 1) as the input data and the detrended yield obtained in step 1) as the output data so as to train the crop yield spatio-temporal deep learning model, obtaining optimal parameters of the crop yield spatio-temporal deep learning model after multiple rounds of the training, and then obtaining a trained model; and step 4): inputting the meteorological parameters of a crop yield to be estimated into the trained model, and outputting an estimation result to obtain a crop yield estimation result.

2. The crop yield estimation method based on spatio-temporal deep learning according to claim 1, wherein the preprocessing the historical crop yield data and the meteorological data of the region in the step 1) comprises: constructing a yield-year univariate linear regression equation according to the historical crop yield data, and performing a detrending process for the crop yield data, taking a residual error obtained by fitting the yield-year univariate linear regression equation as the detrended yield and taking the detrended yield as a true value for the output data of the crop yield spatio-temporal deep learning model; and extracting the meteorological parameters from planting to maturity of crop in a time sequence from the historical meteorological data to be subjected to normalization and taken as the input data of the crop yield spatio-temporal deep learning model.

3. The crop yield estimation method based on spatio-temporal deep learning according to claim 1, wherein the historical meteorological data comprises a daily highest temperature, a daily lowest temperature and a daily average temperature within a fixed time period and a daily precipitation within the fixed time period.

4. The crop yield estimation method based on spatio-temporal deep learning according to claim 1, wherein the constructing the crop yield spatio-temporal deep learning model in the step 2) is mainly connecting an input layer, a long short-term memory neural network layer, an attention neural network layer and a multi-task output layer in sequence;

wherein in the input layer, the meteorological parameter time sequence during a crop growth period is input, and a min-max normalization process is performed to transform a range of each of the meteorological parameters into [0,1];

wherein the long short-term memory neural network layer is composed of long short-term memory neural units, the meteorological parameter $x_t$ at various moments is input into a corresponding long short-term memory group composed of three of the consecutively connected long short-term memory neural units, first long short-term memory neural unit in the long short-term memory group corresponding to the meteorological parameters $x_t$ at all the moments are transmitted and connected in sequence along a time, and share parameters of a neural network; second long short-term memory neural unit in the long short-term memory group corresponding to the meteorological parameters $x_t$ at all the moments are transmitted and connected in sequence along the time, and share the parameters of the neural network; third long short-term memory neural unit in the long short-term memory group corresponding to the meteorological parameters $x_t$ at all the moments are transmitted and connected in sequence along the time, and share the parameters of the neural network; finally, the meteorological parameters $x_t$ at the various moments are processed by the long short-term memory group to output their respective hidden layer features $h_t$;

wherein the attention neural network layer adopts a fully connected neural network layer, inputs the hidden feature $h_t$ extracted by the long short-term memory neural network layer at the various moments t, outputs an attention value at $\alpha_t$ the various moments, and then adjusts the hidden feature $h_t$ of the entire time sequence according to the attention value $\alpha_t$, and performs processing according to the following formula to obtain an attention-weighted hidden feature $\alpha_t h_t$, the attention-weighted hidden features of all the time sequences are merged into a feature vector H;

$$\alpha_t = \text{softmax}(W_A * h_t + b_A)$$

$$H = \alpha_1 h_1 + \alpha_2 h_2 + \ldots + \alpha_t h_t$$

wherein in the formula, $W_A$ and $b_A$ respectively represent a learnable weight matrix and a bias vector of the attention neural network layer, and softmax( ) is an activation function;

wherein the multi-task output layer outputs the crop yield y in a corresponding geographic region r, and the processing is expressed as follows:

$$y = W_r * H + b_r$$

wherein in the formula, r represents an index of the corresponding geographic region, and $W_r$ and $b_r$ respectively represent the learnable weight matrix and the bias vector of the multi-task output layer corresponding to the geographic region r, respectively.

5. The crop yield estimation method based on spatiotemporal deep learning according to claim 1, wherein the optimizing the hyperparameters of the crop yield spatiotemporal deep learning model in the step 2) comprises selecting the optimal model hyperparameters after cross-validating the number of layers of the long short-term memory neural network layers, the number of layers of the attention neural network layers, the number of layers of the multi-task output layers and the number of tasks, a hidden feature dimension of the various layers and a learning rate of model training.

6. The crop yield estimation method based on spatiotemporal deep learning according to claim 1, wherein the outputting the estimation result to obtain the crop yield estimation result in the step 4) comprises:

estimating the crop yield of a crop sample according to the estimation result of the trained model.

* * * * *